United States Patent
Corona

(10) Patent No.: US 8,755,430 B2
(45) Date of Patent: Jun. 17, 2014

(54) SYSTEM AND METHOD FOR AUDIO VIDEO PATTERN SEQUENCE DIAGNOSTIC TOOL

(75) Inventor: Samuel E. Corona, Los Angeles, CA (US)

(73) Assignee: Disney Enterprises, Inc., Burbank, CA (US)

( * ) Notice: Subject to any disclaimer, the term of this patent is extended or adjusted under 35 U.S.C. 154(b) by 312 days.

(21) Appl. No.: 12/928,990

(22) Filed: Dec. 22, 2010

(65) Prior Publication Data

US 2012/0163442 A1 Jun. 28, 2012

(51) Int. Cl.
*H04N 7/12* (2006.01)

(52) U.S. Cl.
USPC .................................. 375/240.01

(58) Field of Classification Search
USPC ................. 375/240.01, 228, 240.05
See application file for complete search history.

(56) References Cited

U.S. PATENT DOCUMENTS

| | | | | |
|---|---|---|---|---|
| 7,817,900 B2 * | 10/2010 | Walker | ........................ | 386/278 |
| 7,877,776 B2 * | 1/2011 | Krikorian et al. | ............... | 725/95 |
| 8,248,527 B2 * | 8/2012 | Wang | ........................... | 348/448 |
| 8,274,570 B2 * | 9/2012 | Handa et al. | ............... | 348/208.3 |
| 8,279,344 B2 * | 10/2012 | Boak | ........................... | 348/513 |

FOREIGN PATENT DOCUMENTS

| | | |
|---|---|---|
| CN | 101243688 | 8/2008 |
| CN | 101512656 | 8/2009 |
| CN | 101646050 | 2/2010 |
| CN | 101687547 | 3/2010 |

OTHER PUBLICATIONS

EESR dated May 2, 2013 Reference p. 19368EP for European Application No. 11186654.7.
"HD HQV Benchmark Testing & Scoring Guide", Jun. 6, 2007, XP055037915, Retrieved from the Internet: http://gizmodo.com/assets/resources/2007/06/SILOPT_HD_HQV_Benchm[6].pdf *14 pages*.
"Proposed SMPTE Recommended Practice", SMPTE—Motion Imaging Journal, Society of Motion Picture and Television Engineers, White Plains, NY, US, vol. 104, No. 8, Aug. 1, 1995, pp. 570-575, P000517875, ISSN 0036-1682 * 12 pages. *
"Video Index Information Coding for 525- and 625-Line Television Systems", SMPTE, <http://standards.smpte.org/content/978-1-61482-200-4/rp-186-2008/SEC1>.

* cited by examiner

*Primary Examiner* — Dang Ton
*Assistant Examiner* — Nourali Mansoury
(74) *Attorney, Agent, or Firm* — Farjami & Farjami LLP

(57) ABSTRACT

There is provided a system and method for confirming correct encoder processing for a media file. There is provided a method comprising preparing a diagnostic clip, embedding the diagnostic clip in the media file to create a modified media file, encoding the modified media file according to a set of encoder settings to create an encoded media file embedded with an encoded diagnostic clip, displaying the encoded diagnostic clip to a user, and assessing the accuracy of the encoder settings based on a feedback received from the user. In this manner, users may quickly and accurately diagnose encoder settings after encoding the media file. Users may more easily identify which encodes caused which problems and avoid the costly overhead of backtracking in the production process.

20 Claims, 4 Drawing Sheets

Fig. 3
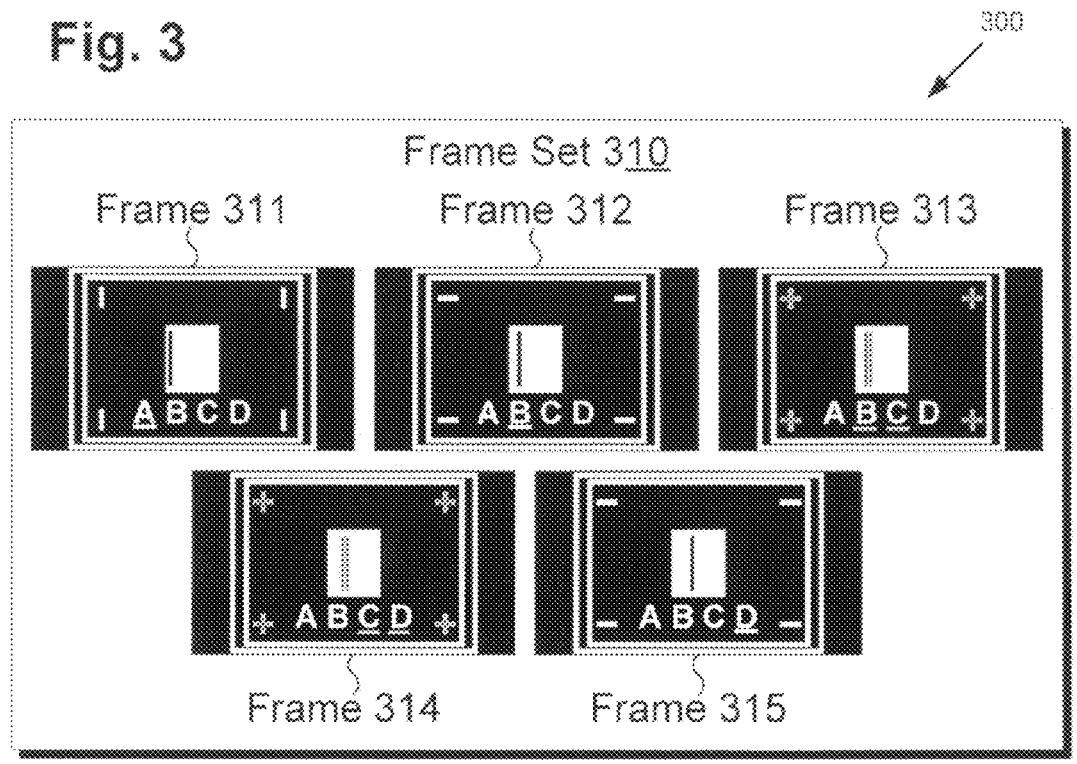
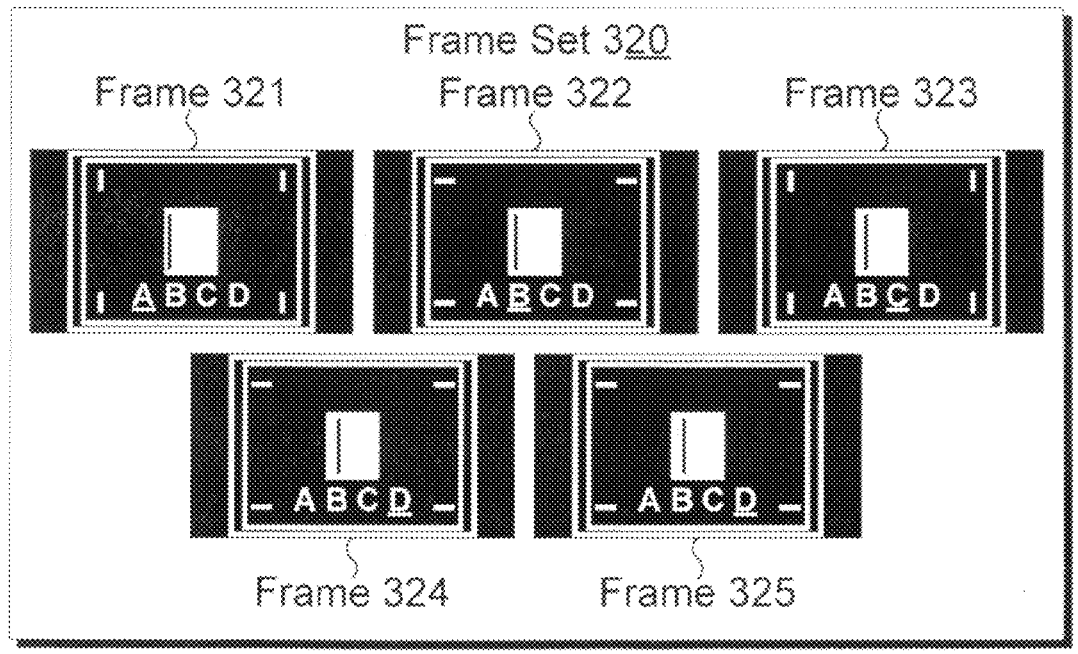

SYSTEM AND METHOD FOR AUDIO VIDEO PATTERN SEQUENCE DIAGNOSTIC TOOL

BACKGROUND OF THE INVENTION

1. Field of the Invention

The present invention relates generally to media file creation. More particularly, the present invention relates to verifying the correct encoding of media files.

2. Background Art

Modern media production workflows increasingly rely on digital formats, such as compressed video data on flash media, rather than analog formats of the past, such as tapes. Digital media provides several advantages over analog media, such as ease of distribution and increased reliability. However, the transition to digital media production workflows has introduced several new problems, particularly with respect to format encoding and transcoding.

For example, specific hardware devices or encoding steps used within a production workflow may require the video data to be in a specific format. Thus, the video data must be manipulated, for example by encoding or transcoding to the appropriate format. Each manipulation, however, increases the risk of introducing encoding errors in the video data. For example, due to differences between hardware, software, production environments, and other variables, encoder settings at particular manipulation steps may be improperly configured. Thus, while an encoded video file may include a valid file structure, the video content may contain encoding errors resulting in video or audio degradation. In addition, pinpointing an encoding step that introduced an error may be difficult in extended multi-step workflows.

Moreover, while some encoding errors may be quickly found using standard manual or automated quality control procedures, other encoding errors may not be immediately apparent or amenable to automatic detection. Some errors, such as detecting incorrect cadence, often require close manual examination and knowledge of the specific problem. Other errors, such as audio down-mixing, may be difficult to detect even with knowledge of the problem. Thus, encoding mistakes may go undetected until later stages of a production process, necessitating expensive and time consuming backtracking to restore proper video and audio quality.

Accordingly, there is a need to overcome the drawbacks and deficiencies in the art by providing a diagnostic tool that enables users to quickly and accurately confirm the correct video and audio encoding of media content.

SUMMARY OF THE INVENTION

There are provided systems and methods for a media content diagnostic tool comprising audio and video pattern sequences embedded in a media file to confirm correct encoder processing after encoding, substantially as shown in and/or described in connection with at least one of the figures, as set forth more completely in the claims.

BRIEF DESCRIPTION OF THE DRAWINGS

The features and advantages of the present invention will become more readily apparent to those ordinarily skilled in the art after reviewing the following detailed description and accompanying drawings, wherein:

FIG. 3 presents two sets of frames from the diagnostic tool, according to one embodiment of the present invention.

DETAILED DESCRIPTION OF THE INVENTION

The present application is directed to a system and method for a media content diagnostic tool comprising audio and video pattern sequences embedded in a media file to confirm correct encoder processing after encoding. The following description contains specific information pertaining to the implementation of the present invention. One skilled in the art will recognize that the present invention may be implemented in a manner different from that specifically discussed in the present application. Moreover, some of the specific details of the invention are not discussed in order not to obscure the invention. The specific details not described in the present application are within the knowledge of a person of ordinary skill in the art. The drawings in the present application and their accompanying detailed description are directed to merely exemplary embodiments of the invention. To maintain brevity, other embodiments of the invention, which use the principles of the present invention, are not specifically described in the present application and are not specifically illustrated by the present drawings.

Figure 1:
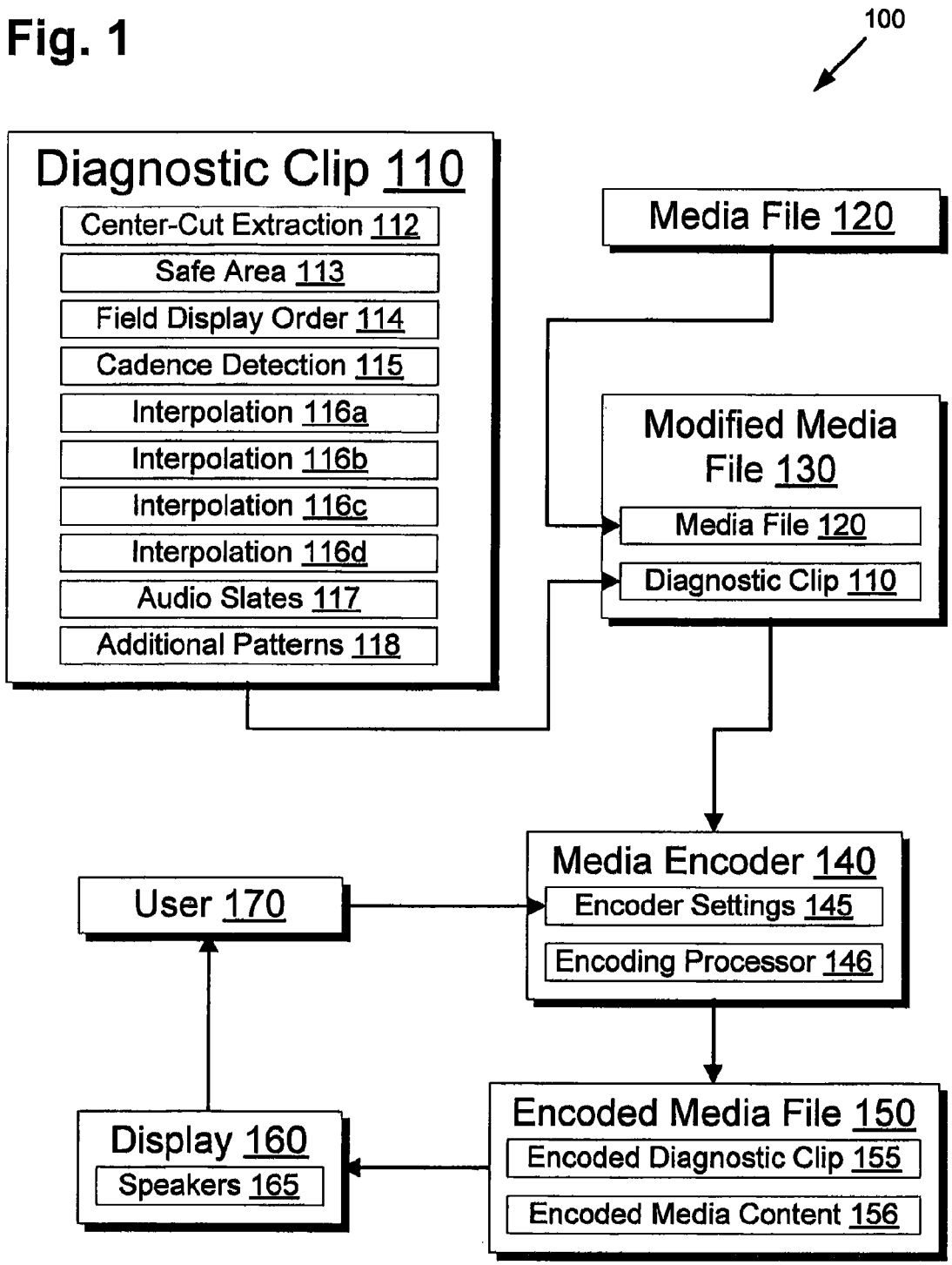
FIG. 1 presents a system for a media content diagnostic tool comprising audio and video pattern sequences embedded in a media file to confirm correct encoder processing after encoding, according to one embodiment of the present invention.

FIG. 1 presents a system for a media content diagnostic tool comprising audio and video pattern sequences, according to one embodiment of the present invention. Diagram 100 of FIG. 1 includes diagnostic clip 110, media file 120, modified media file 130, media encoder 140, encoded media file 150, display 160, and user 170. Diagnostic clip 110 includes center-cut extraction 112, safe area 113, field display order 114, cadence detection 115, interpolation 116a, interpolation 116b, interpolation 116c, interpolation 116d, audio slates 117, and additional patterns 118. Modified media file 130 includes media file 120 and diagnostic clip 110. Media encoder 140 includes encoder settings 145, encoding processor 146, such as a microprocessor, and memory (not shown) for storing instructions for execution by processor 146 and data storage and retrieval. Encoded media file 150 includes encoded diagnostic clip 155 and encoded media content 156. Display 160 includes speakers 165.

Diagnostic clip 110 may comprise a ten second video sequence comprising a set of graphical patterns and audio tracks, such as center-cut extraction 112, safe area 113, field display order 114, cadence detection 115, interpolation 116a-116d, audio slates 117, and additional patterns 118. Diagnostic clip 110 may be used as a diagnostic tool for a media file undergoing encodes or transcodes by providing immediate visual and aural feedback.

According to one embodiment of the present invention, diagnostic clip 110 may be a file object within a media encoding system. However, in alternative embodiments, the components of diagnostic clip 110 may comprise a standalone process or method. Thus, depending on the desired detection features, any combination of center-cut extraction 112, safe area 113, field display order 114, cadence detection 115, interpolation 116a-116d, audio slates 117, and additional patterns 118 may be applied as a standalone process to any media content for diagnostic testing.

Center-cut extraction 112 may aid in exposing any issues with inaccurate 4×3 center-cut extraction from 16×9 source material. Because a 16×9 source material is a larger resolution than can be displayed on a 4×3 screen, a 4×3 video may be extracted from the 16×9 material. Center-cut extraction 112 may help determine whether the correct material was extracted. Safe area 113 may provide a similar function. Certain images may have to stay within a safe area of the video screen, which may be a smaller area within the 4×3 center-cut. Safe area 113 may help determine whether correct images remain within the safe area.

Field display order 114 may assist in identifying incorrect field display order or field dominance. Media file 120 may need to be broadcast to an interlaced output device, such as an older television set. Interlaced devices receive video as a stream of fields. A field contains data for every other scanline of the display, in contrast with a frame, which contains data for every scanline. Half of the fields are upper fields, which are the fields that contain data from the odd-numbered scanlines starting with the top scanline. Lower fields contain the even-numbered scanlines, starting with the second scanline from the top. The upper and lower fields may then be paired as a frame, forming a complete set of scanlines. Field dominance determines whether a frame starts with its upper or lower field. Incorrect upper/lower field dominance may produce stuttered video motion.

Cadence detection 115 may aid in detecting incorrect cadence. The sequence of fields in the media file must have the correct cadence to be displayed properly. For example, a source material may comprise frames A, B, C, and D in sequence. If that sequence of frames underwent an encoding process, such as doubling each frame into field pairs, the cadence must remain intact. The resulting sequence should read A-A-B-B-C-C-D-D. Thus, a sequence such as A-A-B-C-B-C-D-D would be incorrect cadence.

Interpolation 116a-116d may help in detecting interpolation. Interpolation, specifically temporal interpolation, occurs when adjacent frame images are blended together. The interpolated image may contain elements of both blended images. Interpolation 116a-116d may indicate if interpolation was induced during encoding.

Audio slates 117 may comprise several audio tracks that may aid in diagnosing audio problems. Audio slates 117 may comprise audio slates for each of the 24 standard audio channels. Each track may have a voice announcing the track number, which corresponds to the original channel the track resides on. For example, spoken words "channel 1" may be heard when playing back channel 1. The tracks may also be staggered, thus a track may never be heard in sync with another track. Encodes may re-assign or re-map audio tracks from the original channel positions to new ones. Audio slates 117 may assist in the difficult and error prone task of confirming what audio track exists on which channel. For example, channel 3 may have been re-mapped to channel 7. With audio slates 117, "channel 3" may be heard when playing back channel 7. Hearing another track number, hearing no voice, or hearing "channel 3" on another channel may indicate an audio mapping issue.

Additionally, audio slates 117 may also help discover unintentional down-mixing. During the encoding of media file 120, several tracks may be accidentally sent to the same channel, or down-mixed. Normally, listening to the audio is a difficult way to detect unintentional down-mixing. However, when audio slates 117 undergoes down-mixing, the error may be easier to discover. Because audio slates 117 are staggered, several asynchronous voices may be heard if several tracks have been down-mixed. In addition, the staggered audio simplifies the process of identifying the track numbers that were down-mixed.

Additional patterns 118 may comprise additional graphical patterns or audio tracks, or variations of existing patterns and tracks. Additional tools, such as additional letter-box demarcations, may be necessary to diagnose issues not detectable with a default pattern set. Additional patterns 118 may also comprise other information, such as timestamps or identifiers.

Media file 120 may comprise media content which will undergo encodes or transcodes by media encoder 140. It may, for example, comprise original source material. Alternatively, media file 120 may comprise media content that has already been encoded and will be encoded again. Because encodes may introduce unwanted results in its media content, media file 120 may require verification of its media content.

Modified media file 130 may comprise media file 120 and diagnostic clip 110. Diagnostic clip 110 may be placed at the head or tail of media file 120, similar to bars and tone signals used in video masters, to form modified media file 130. In alternative embodiments, diagnostic clip 110 may be used as a stand-alone clip. Regardless of the method, diagnostic clip 110 may be encoded by the same encoder settings 145 as media file 120.

Media encoder 140 may comprise a computing device capable of performing encodes or transcodes on modified media file 130. Media encoder 140 may also be configured with encoder settings 145. Unfortunately, the incorrect settings may result in unwanted changes to modified media file 130. However, encoder settings 145 may be correctly reconfigured with correct settings through additional input, such as from user 170 though a computer interface. Then, media encoder 140 may re-encode modified media file 130. Media encoder 140 may additionally comprise encoding processor 145. Encoding processor 145 may comprise a processor capable of performing encodes or transcodes on modified media file 130 according to encoder settings 145. After encoding or transcoding modified media file 130 into encoded media file 150, media encoder 140 may output encoded media file 150 to display 160. Alternatively, media encoder 140 may also store encoded media file 150 for future reference.

Encoded media file 150 may comprise the result of media encoder 140's encodes on modified media file 130. Encoded media file 150 may comprise encoded diagnostic clip 155 and encoded media content 156, which may comprise the encoded versions of diagnostic clip 110 and media file 120, respectively. Although depicted in FIG. 1 as elements of encoded media file 150, in alternative embodiments encoded diagnostic clip 155 and encoded media content 156 may each comprise separate files.

Display 160 may comprise any device capable of displaying encoded media file 150. Display 160 may comprise the same device as media encoder 140, such as a server. Alternatively, display 160 may be a remote machine, such as a workstation. Display 160 may also comprise speakers 165. Speakers 165 may comprise any device capable of outputting the audio from encoded media file 150. Speakers 165 may be part of display 160, as shown in FIG. 1, or may comprise a separate device, such as standalone speakers.

User 170 may comprise a person or persons trained to use diagnostic clip 110. User 170 may be able to view encoded diagnostic clip 155 and interpret its graphical patterns and audio tracks. In addition, user 170 may be able to reconfigure encoder settings 145.

Diagnostic clip 110 may first be customized by user 170. For example, center-cut extraction 112, safe area 113, field display order 114, cadence detection 115, interpolation 116a-116d, audio slates 117, and additional patterns 118 may all vary to suit the needs of user 170. Diagnostic clip 110 may then be bundled with media file 120, either as one file or separate files, to form modified media file 130. Modified media file 130 may then be sent to media encoder 140 to undergo encodes.

Media encoder 140 encodes modified media file 130 to encoded media file 150 according to encoder settings 145. Encoder settings 145 may be preconfigured with settings for a particular encode. After the particular encoding, user 170 may then view and hear encoded media file 150 immediately on display 160. Undesired results in encoded diagnostic clip 155 may be symptoms of common encoding issues, such as an inaccurate 4×3 center-cut extraction from 16×9 source material, a reversed field display order, an incorrect video cadence, an interpolation, an improper audio channel mapping, or an unwanted audio down-mixing. By recognizing any anomalous graphical patterns and audio tracks in encoded diagnostic clip 155, user 170 may determine what settings in encoder settings 145 require adjustment.

Encoded diagnostic clip 155 may also reveal which encodes caused problems. For example, if after the particular encode, encoded diagnostic clip 155 developed a graphical anomaly, user 170 may know that that particular encode caused the error. User 170 may then reconfigure encoder settings 145 to correct the issues revealed by encoded diagnostic clip 155. After re-encoding modified media file 130, user 170 may immediately watch encoded diagnostic clip 155 again and reconfigure encoder settings 145 based on that feedback. User 170 may repeat this cycle until encoded diagnostic clip 155 is free of errors. Alternatively, media encoder 140 may perform all encoding jobs needed on modified media file 130 while storing intermediary encodes. User 170 may later review the intermediary encodes to identify specific problematic encodes.

When encoded diagnostic clip 155 no longer displays graphical or audio anomalies, encoded media content 156 may be error-free as well, because both undergo encodes with the same encoder settings 145. The resultant encoded media file 150 may then be ready for broadcast or additional processing.

Figure 2:
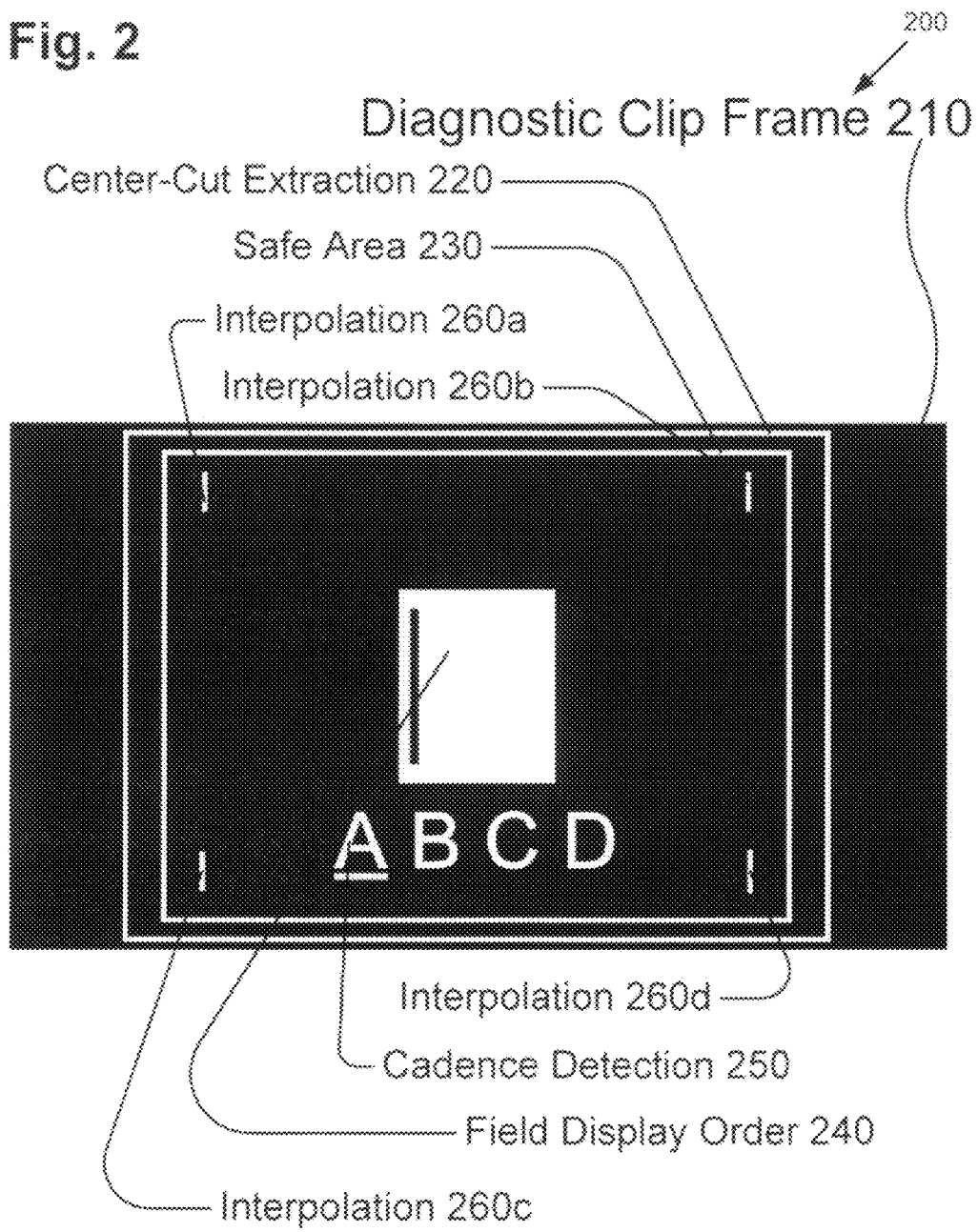
FIG. 2 presents a single frame from the diagnostic tool, according to one embodiment of the present invention.

Moving to FIG. 2, FIG. 2 may represent a single frame from diagnostic clip 110 in FIG. 1, according to one embodiment of the present invention. Diagram 200 of FIG. 2 includes diagnostic clip frame 210. Diagnostic clip frame 210 includes center-cut extraction 220, safe area 230, field display order 240, cadence detection 250, interpolation 260a, interpolation 260b, interpolation 260c, and interpolation 260d.

Diagnostic clip frame 210 may represent one frame from diagnostic clip 110's video sequence. Diagnostic clip frame 210 may comprise an image of 1920 pixels across, and 1080 pixels down. In the embodiment depicted in FIG. 2, diagnostic clip frame 210 comprises a frame with a 16×9 black background. In alternative embodiments, diagnostic clip frame 210 may comprise a frame with a different background, such as a 16×9 video image. Diagnostic clip frame 210 may comprise graphical patterns from center-cut extraction 220, safe area 230, field display order 240, cadence detection 250, and interpolation 260a-260d, which may all vary to suit user 170's needs. Diagnostic clip frame 210 may also comprise additional patterns 118 from FIG. 1, depending on user 170's needs.

Center-cut extraction 220, which may correspond to center-cut extraction 112 in FIG. 1, may comprise markers that delineate a certain area within the frame. As shown in FIG. 2, center-cut extraction 220 may comprise an outer white rectangle within the frame. Center-cut extraction 220 may represent the exact area for the active video of a correctly extracted 4×3 image. In one embodiment, the top line of center-cut extraction 220 may reside on line 21 and the bottom line on line 1123, when displayed as a 1080 23.98 PsF signal. The left-side line may reside at pixel 240, and the right-side line at pixel 1679. User 170 may verify the center-cut extraction by viewing the resultant active video. If an image falls short or exceeds any of center-cut extraction 220's white borders, the image may not be sized correctly. Alternatively, user 170 may look for the white borders at all four sides of the 4×3 image.

Safe area 230, which may correspond to safe area 113 in FIG. 1, may also comprise markers which delineate a certain area within the frame. As shown in FIG. 2, safe area 230 may comprise a white rectangle inside the outer white rectangle, or center-cut extraction 220. Safe area 230 may delineate an area which is a fraction of center-cut extraction 220, such as 90%. Thus, a 90% safe area may delineate 90% of the area represented by center-cut extraction 220. User 170 may then verify any images that must remain in the safe area by checking to see if the images stay within safe area 230's white border. User 170 may also be able to determine if parts of the frame's image, such as its center, have been disproportionately expanded compared to the rest of the frame's image, such as its edges.

Field display order 240, which may correspond to field display order 114 in FIG. 1, may comprise visual cues that loop through the entirety of diagnostic clip 110's sequence. In the embodiment depicted in FIG. 2, field display order 240 comprises a black vertical bar on a white box background. Field display order 240 may be smaller than safe area 230, and placed near the center of the frame. The black bar may move horizontally within the white box. Starting from the left, the black bar may move to the right every second, and then loop back. The black bar's stuttering or jerky motion, instead of fluid motion, may indicate an incorrect field display order.

Cadence detection 250, which may correspond to cadence detection 115 in FIG. 1, may comprise various markings capable of displaying information about a frame cadence. In FIG. 2, cadence detection 250 comprises the letters "A," "B," "C," and "D" near the bottom of the screen. Each letter may correspond to successive frames, starting with the "A-frame," and returning to A after D. The underscore, seen below A in FIG. 2, may indicate which frame is currently viewed. As diagnostic clip 110's sequence progresses, the white underscore may shift from A to B to C and so forth, until it loops back to A after D. User 170 may then be able to recognize incorrect cadence by viewing the underscore's movement. Additionally, user 170 may verify that the cadence begins on the A-frame at the top of each second, which may be as critical as the correct cadence itself. Cadence detection 250 allows the user to verify cadence without regard to the display hardware or player software being used.

Interpolation 260a-260d, which may respectively correspond to interpolation 116a-116d in FIG. 1, each comprise a marker which may assist user 170 in detecting interpolation within video images. As shown in FIG. 2, interpolation 260a-260d may each comprise a dash pattern, in a vertical orientation, at the corners within safe area 230. With each successive frame, interpolation 260a-260d may alternate from vertical to horizontal orientations. If interpolation was induced during an encode, the interpolated frames may blend the alternating orientations together, forming a cross shape instead of a single dash. User 170 may then be able to quickly determine if interpolation was induced, by viewing cross shapes instead of horizontal or vertical dash shapes.

Moving to FIG. 3, FIG. 3 may represent two sets of frames from encoded diagnostic clip 155, according to one embodiment of the present invention. Diagram 300 of FIG. 3 includes frame set 310 and frame set 320. Frame set 310 includes frame 311, frame 312, frame 313, frame 314, and frame 315. Frame set 320 includes frame 321, frame 322, frame 323, frame 324, and frame 325.

Frame set 310 may comprise a sequence of five consecutive frames from encoded diagnostic clip 155. Frame set 310 may comprise frame 311-315. Frame 311-315, which may each correspond to diagnostic clip frame 210 in FIG. 2, each comprises a frame from encoded diagnostic clip 155's video sequence. Accordingly, each of frame 311-315 may comprise similar elements to diagnostic clip frame 210.

Likewise, frame set 320 may also comprise a sequence of five consecutive frames from encoded diagnostic clip 155. Frame set 320 may comprise frame 321-325. Frame 321-325, which may each correspond to diagnostic clip frame 210 in FIG. 2, each comprises a frame from encoded diagnostic clip 155's video sequence. Accordingly, each of frame 311-315 may comprise similar elements to diagnostic clip frame 210.

Because many of the problems revealed by diagnostic clip 110 may involve multiple frames, user 170 may need to view several frames to detect certain problems. For example, verifying cadence after a 2:3 pull-down requires viewing multiple frames. NTSC video is broadcast at 30 or 29.97 frames per second (fps). However, a source material may be filmed at 24 or 23.98 fps. Content at 24 fps must be converted to 30 fps. The frame ratio is 24/30, or 4/5, which means for every 4 frames at 24 fps, there should be 5 frames for 30 fps. 2:3 pull-down is a method of stretching the 4 frames into 5. For example, if the 24 fps content had source frames A, B, C, and D, then the corresponding fields are normally made by placing the same frame across the upper and lower field pair. The cadence would be A-A-B-B-C-C-D-D, yielding frames AA, BB, CC, and DD. To get that extra frame, every other frame is placed across three, rather than two fields. Thus, the 2:3 cadence would now be A-A-B-B-B-C-C-D-D-D, and the five frames would consist of AA, BB, BC, CD, and DD.

Frame set 310 and 320 may each represent a possible diagnostic tool sequence after a 2:3 pull-down of a 24 fps source. The four corner patterns in each of frame 311-315, 321-325 may each correspond to interpolation 116a-116d in FIG. 1, and interpolation 260a-260d in FIG. 2; the four letters and underscores in each of frame 311-315, 321-325 may correspond to cadence detection 115 in FIG. 1, and cadence detection 250 in FIG. 2; and the white boxes containing vertical bars in each of frame 311-315, 321-325 may each correspond to field display order 114 in FIG. 1, and field display order 240 in FIG. 2.

Frame set 310 may comprise frame 311-315 shown in "full frame," wherein both fields of a frame are shown together. Frame 311 may show no sign of interpolation, as the corner marks are full white dashes instead of crosses, which indicates both fields are from the same source frame. In addition, frame 311 may be the A-frame, as indicated by the underscore below A. Therefore frame 311 may be frame AA. In a similar fashion, frame 312 and 315 may be frame BB and DD, respectively. Frame 313 may show signs of interpolation, because the corner marks are gray crosses instead of white dashes, which indicates the blending of black and white. The gray underscores beneath letters B and C suggest the blending of fields from frames B and C, indicating frame 313 may be frame BC. In a similar fashion, frame 314 may be identified as frame CD. Frame 313 and 314 are jitter frames because they may have been blended from two different source frames.

Since frame 311-315 may comprise frames AA, BB, BC, CD, DD from the 2:3 cadence discussed above, frame set 310 may follow the correct 2:3 cadence, which includes starting on the A-frame. Finally, the vertical black bar moves from left to right in the frame sequence, indicating correct field order.

Frame set 320 may comprise frame 321-325 shown in "field mode," wherein only one of the two fields per frame is displayed. Here, frame set 320 may display the second field only, and thus no jitter frames may be present. Since the corner dashes alternate according to the frame, none of frame 321-325 show signs of interpolation, which may be expected in field mode. The underscores indicate frame 321-325 may comprise frames A, B, C, D, and D again, respectively. A correct cadence in field mode, after taking out the first fields from the 2:3 cadence, is A-B-C-D-D. Thus, frame set 320 may follow the correct cadence, starting with the A-frame as well. According to frame set 310 and 320, user 170 may not need to adjust encoder settings 145 with respect to cadence, field order, or interpolation.

Figure 4:
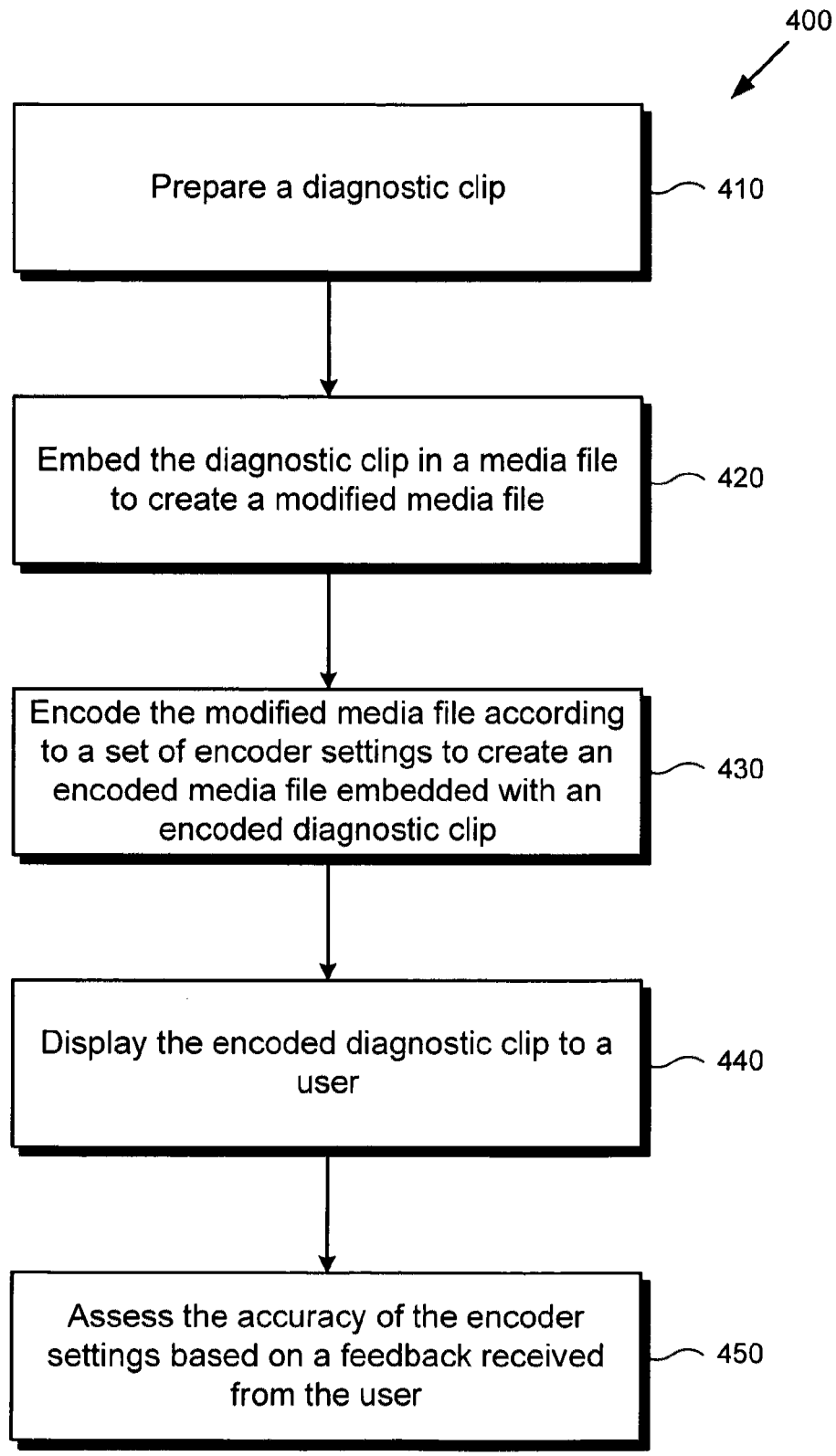
FIG. 4 shows a flowchart describing the steps, according to one embodiment of the present invention, by which a trained user may utilize the diagnostic tool to confirm correct encoder processing for a media file after encoding.

Moving to FIG. 4, FIG. 4 shows a flowchart describing the steps, according to one embodiment of the present invention, by which a trained user may utilize a diagnostic tool to verify media content after an encode. Certain details and features have been left out of flowchart 400 that are apparent to a person of ordinary skill in the art. For example, a step may comprise one or more substeps or may involve specialized equipment or materials, as known in the art. While steps 410 through 450 indicated in flowchart 400 are sufficient to describe one embodiment of the present invention, other embodiments of the invention may utilize steps different from those shown in flowchart 400.

Referring to step 410 of flowchart 400 in FIG. 4 and diagram 100 of FIG. 1, step 410 of flowchart 400 comprises preparing diagnostic clip 110 in FIG. 1 for encodes. Diagnostic clip 110 may be preset with a default set of graphical patterns. However, user 170 may also want to add or modify graphical or audio patterns. For example, user 170 may wish to modify safe area 113 by reducing its size, or add additional patterns 118. User 170 may know what graphical and audio patterns have been set, thus expecting a certain output from encoded diagnostic clip 155.

Referring to step 420 of flowchart 400 in FIG. 4 and diagram 100 of FIG. 1, step 420 of flowchart 400 comprises embedding diagnostic clip 110 in media file 120 to form modified media file 130. As previously discussed, diagnostic clip 110 may be placed at the head or tail of media file 120 before any encodes. Alternatively, diagnostic clip 110 may be used as a stand-alone clip that would follow media file 120 through a tapeless workflow. Diagnostic clip 110 may undergo the same encodes as media file 120, ensuring that user 170's diagnosis of diagnostic clip 110 applies to media file 120 as well.

Referring to step 430 of flowchart 400 in FIG. 4 and diagram 100 of FIG. 1, step 430 of flowchart 400 comprises media encoder 140's encoding processor 146 encoding modified media file 130 according to encoder settings 145 to create encoded media file 150. Encoded media file 150 may comprise encoded diagnostic clip 155 and encoded media content 156, which may comprise the encoded versions of diagnostic clip 110 and media file 120, respectively. Encoder settings 145 may not be properly configured to correctly encode modified media file 130. Encoder settings 145 may require adjustments, after which modified media file 130 may be re-encoded.

Referring to step 440 of flowchart 400 in FIG. 4 and diagram 100 of FIG. 1, step 440 of flowchart 400 comprises displaying encoded diagnostic clip 155 on display 160 to user 170. As previously discussed, display 160 may comprise a separate device from media encoder 140. User 170 may also need to hear encoded diagnostic clip 155 through speakers 165. Speakers 165 may comprise a separate device from display 160 or may comprise the same device. Display 160 may faithfully display encoded diagnostic clip 155, including any errors created from encoding.

Referring to step 450 of flowchart 400 in FIG. 4, diagram 100 of FIG. 1, and diagram 200 of FIG. 2, step 450 of flowchart 400 comprises user 170 assessing the accuracy of encoder settings 145 by viewing encoded diagnostic clip 155. User 170 may view encoded diagnostic clip 155 to receive immediate visual and aural feedback as to the unwanted effects of encoding. As previously discussed, the elements of diagnostic clip frame 210 may provide user 170 with various indicators about common issues that may arise after encodes. For example, user 170 may notice that parts of center-cut extraction 220 do not appear, indicating an error with a center-cut extraction. User 170 may then correct the center-cut extraction settings in encoder settings 145. Display 160 may allow user 170 to adjust encoder settings 145. Alternatively, user 170 may adjust encoder settings 145 through media encoder 140 directly. Once the known issues are resolved, diagnostic clip 110 may then be re-encoded according to the adjusted encoder settings 145 and subsequently reviewed by user 170 to verify the corrections made. In the example, user 170 may redo the center-cut extraction and then confirm that center-cut extraction 220 appears correctly on screen.

From the above description of the invention it is manifest that various techniques can be used for implementing the concepts of the present invention without departing from its scope. Moreover, while the invention has been described with specific reference to certain embodiments, a person of ordinary skills in the art would recognize that changes can be made in form and detail without departing from the spirit and the scope of the invention. As such, the described embodiments are to be considered in all respects as illustrative and not restrictive. It should also be understood that the invention is not limited to the particular embodiments described herein, but is capable of many rearrangements, modifications, and substitutions without departing from the scope of the invention.

What is claimed is:

1. A system for confirming correct encoder processing for a media file, the system comprising:
   a diagnostic clip including graphical patterns;
   a modified media file created by embedding the diagnostic clip in the media file;
   a processor configured to:
      encode the modified media file according to a set of encoder settings to create an encoded media file embedded with an encoded diagnostic clip;
      display the encoded diagnostic clip to a user; and
      receive adjusted encoder settings based on a feedback received from the user,
   wherein the feedback is based on the graphical patterns in the encoded diagnostic clip.

2. The system of claim 1, wherein the diagnostic clip is further configured to:
   demonstrate video and audio errors from the encoder settings.

3. The system of claim 1, wherein the diagnostic clip is further configured to:
   indicate an accuracy of a center-cut extraction.

4. The system of claim 1, wherein the diagnostic clip is further configured to:
   indicate an integrity of a safe area.

5. The system of claim 1, wherein the diagnostic clip is further configured to:
   illustrate a field display order.

6. The system of claim 1, wherein the diagnostic clip is further configured to:
   demonstrate a video cadence.

7. The system of claim 1, wherein the diagnostic clip is further configured to:
   indicate a presence of an interpolation.

8. The system of claim 1, wherein the diagnostic clip is further configured to:
   identify all audio channels.

9. The system of claim 1, wherein the diagnostic clip is further configured to:
   display additional video patterns.

10. The system of claim 1, wherein the diagnostic clip is further configured to:
    play back additional audio sequences.

11. A method for confirming correct encoder processing for a media file, the method comprising:
    preparing a diagnostic clip including graphical patterns;
    embedding the diagnostic clip in the media file to create a modified media file;
    encoding the modified media file according to a set of encoder settings to create an encoded media file embedded with an encoded diagnostic clip;
    displaying the encoded diagnostic clip to a user; and
    assessing the accuracy of the encoder settings based on a feedback received from the user, wherein the feedback is based on the graphical patterns in the encoded diagnostic clip.

12. The method of claim 11, wherein the displaying further:
    demonstrates video and audio errors from the encoder settings.

13. The method of claim 11, wherein the displaying further:
    indicates an accuracy of a center-cut extraction.

14. The method of claim 11, wherein the displaying further:
    indicates an integrity of a safe area.

15. The method of claim 11, wherein the displaying further:
    illustrates a field display order.

16. The method of claim 11, wherein the displaying further:
    demonstrates a video cadence.

17. The method of claim 11, wherein the displaying further:
    indicates a presence of an interpolation.

18. The method of claim 11, wherein the displaying further:
    identifies all audio channels.

19. The method of claim 11, wherein the displaying further:
    displays additional video patterns.

20. The method of claim 11, wherein the displaying further:
    plays back additional audio sequences.

* * * * *